United States Patent
Su

(10) Patent No.: US 8,472,168 B2
(45) Date of Patent: Jun. 25, 2013

(54) PACKAGE STRUCTURE

(75) Inventor: Chih-Hsin Su, Miaoli County (TW)

(73) Assignee: Mitac International Corp., Taoyuan (TW)

( * ) Notice: Subject to any disclaimer, the term of this patent is extended or adjusted under 35 U.S.C. 154(b) by 213 days.

(21) Appl. No.: 12/966,553

(22) Filed: Dec. 13, 2010

(65) Prior Publication Data

US 2011/0304962 A1     Dec. 15, 2011

(30) Foreign Application Priority Data

Jun. 15, 2010 (TW) ................................. 99119467 A

(51) Int. Cl.
*H05K 7/00* (2006.01)

(52) U.S. Cl.
USPC ............ 361/679.01; 361/679.04; 361/679.09; 361/679.11; 361/679.3; 361/679.43; 361/679.55

(58) Field of Classification Search
USPC ............................ 361/679, 680, 683; 206/736
See application file for complete search history.

(56) References Cited

U.S. PATENT DOCUMENTS

| 5,818,691 A | * | 10/1998 | McMahan et al. | 361/679.43 |
| 6,700,775 B1 | * | 3/2004 | Chuang et al. | 361/679.01 |
| 2004/0113036 A1 | * | 6/2004 | Gilbert | 248/346.01 |

FOREIGN PATENT DOCUMENTS

CN       2759074 Y    2/2006

* cited by examiner

*Primary Examiner* — Tuan T Dinh
*Assistant Examiner* — Mukund G Patel
(74) *Attorney, Agent, or Firm* — Birch, Stewart, Kolasch & Birch, LLP

(57) ABSTRACT

A package structure for packaging a portable electronic device is provided. The package structure includes a base portion, a supporting portion and a connector. The supporting portion is connected to the base portion. The supporting portion includes a first fixing element and a second fixing element, wherein when the package structure is in a supporting state, the supporting portion is folded and standing upright, the first fixing element is detachably connected to the second fixing element, and the portable electronic device is supported by the supporting portion. The connector is disposed on the supporting portion, wherein the portable electronic device is connected to the connector.

16 Claims, 8 Drawing Sheets

PACKAGE STRUCTURE

CROSS REFERENCE TO RELATED APPLICATIONS

This Application claims priority of Taiwan Patent Application No. 099119467, filed on Jun. 15, 2010, the entirety of which is incorporated by reference herein.

BACKGROUND OF THE INVENTION

1. Field of the Invention

The present invention relates to a package structure, and in particular relates to package structure for packaging a portable electronic device.

2. Description of the Related Art

Conventional package structures for packaging a portable electronic device, such as a leather cover, only provide the function of covering the portable electronic device. When users need to stand the portable electronic device upright, there is no adequate supporting element for supporting the portable electronic device.

Chinese Patent Application No. 200420012866 discloses a leather cover, which includes a clamping member. The clamping member clamps a baffle of vehicle air conditioning to fix the leather cover in a vehicle. However, the leather cover of Chinese Patent Application No. 200420012866 cannot be fixed on a table, and application thereof is limited.

BRIEF SUMMARY OF THE INVENTION

A package structure for packaging a portable electronic device is provided. The package structure includes a base portion, a supporting portion and a connector. The supporting portion is connected to the base portion. The supporting portion comprises a first fixing element and a second fixing element, wherein when the package structure is in a supporting state, the supporting portion is folded and standing upright, the first fixing element is detachably connected to the second fixing element, and the portable electronic device is supported by the supporting portion. The connector is disposed on the supporting portion, wherein the portable electronic device is connected to the connector.

Utilizing the embodiments of the invention, the portable electronic device can stand upright using the package structure without additional supporting members. Additionally, an input interface is provided with the package structure so that a user can input data or instructions to the portable electronic device therethrough. Therefore, the embodiment allows users to use the portable electronic device in a convenient way.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
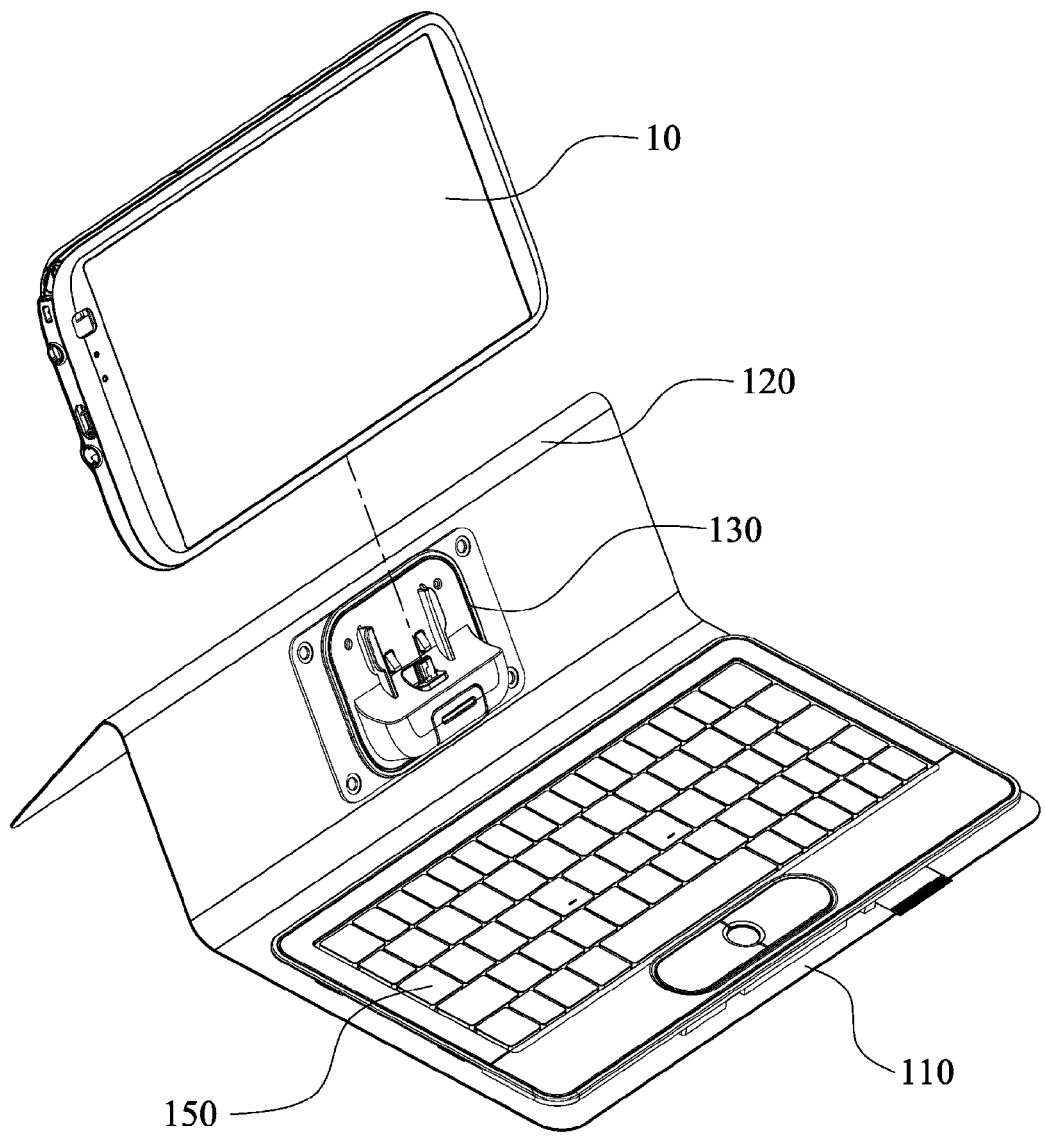
FIG. 1A shows a package structure of an embodiment of the invention wherein a portable electronic device is detached therefrom.
Figure 1B:
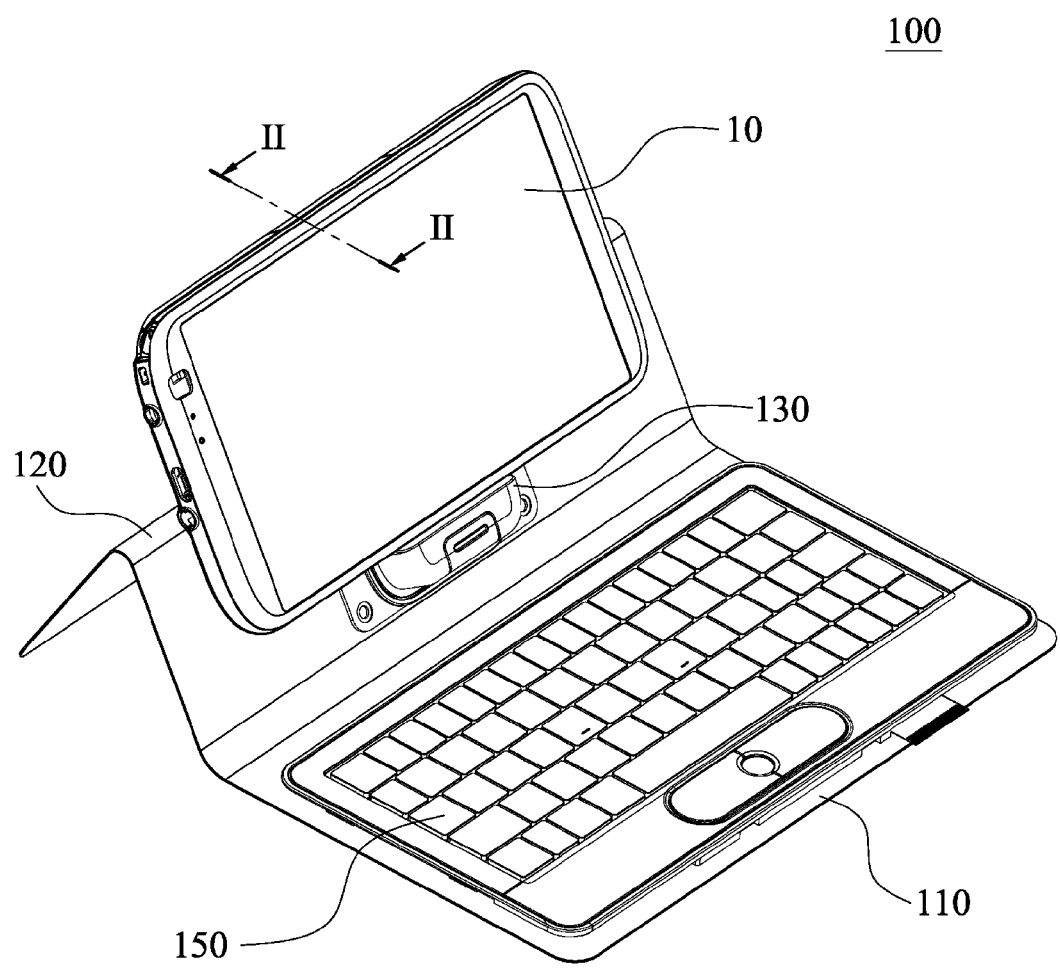
FIG. 1B shows the package structure of the embodiment of FIG. 1A, wherein the portable electronic device is disposed thereon.
Figure 2:
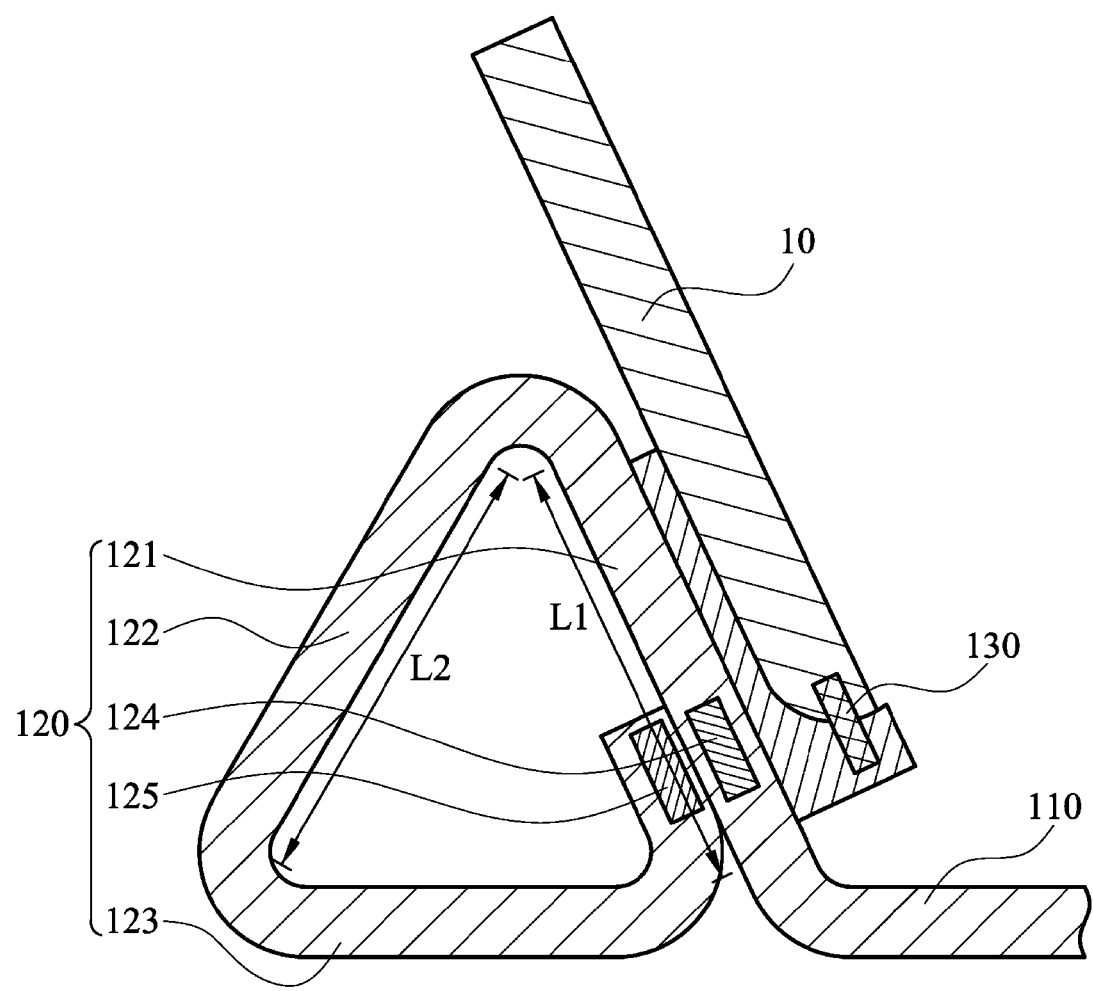
FIG. 2 is a cross-sectional diagram along a II-II direction of FIG. 1B.

FIGS. 1A and 1B show a package structure (leather cover) 100 of an embodiment of the invention. The package structure 100 is for packaging a portable electronic device 10. The package structure 100 comprises a base portion 110, a supporting portion 120 and a connector 130. The supporting portion 120 is connected to the base portion 110. With reference to FIG. 2, which is a cross-sectional diagram along a II-II direction of FIG. 1B, the supporting portion 120 comprises a first supporting section 121, a second supporting section 122 and an extending section 123, wherein the first supporting section 121 is connected to the base portion 110 and the second supporting section 122, the extending section 123 is connected to the second supporting section 122, a first fixing element 124 is disposed at the first supporting section 121, and a second fixing element 125 is disposed on the extending section 123. When the package structure 100 is in a supporting state (FIGS. 1A, 1B and 2), the supporting portion 120 is folded and standing upright, the first fixing element 124 is connected to the second fixing element 125, and the portable electronic device 10 is supported by the supporting portion 121. The connector 130 is disposed on the supporting portion 120, wherein the portable electronic device 10 is detachably connected to the connector 130.

With reference to FIG. 2, the connector 130 is disposed on a surface of the first supporting section 121, and the first fixing element 124 is embedded in the first supporting section 121. When the package structure 100 is in the supporting state, a cross-section of the supporting portion 120 is similar to an isosceles triangle, and a length L1 of a cross-section of the first supporting section 121 equals to a length L2 of a cross-section of the second supporting section 122.

Figure 3:
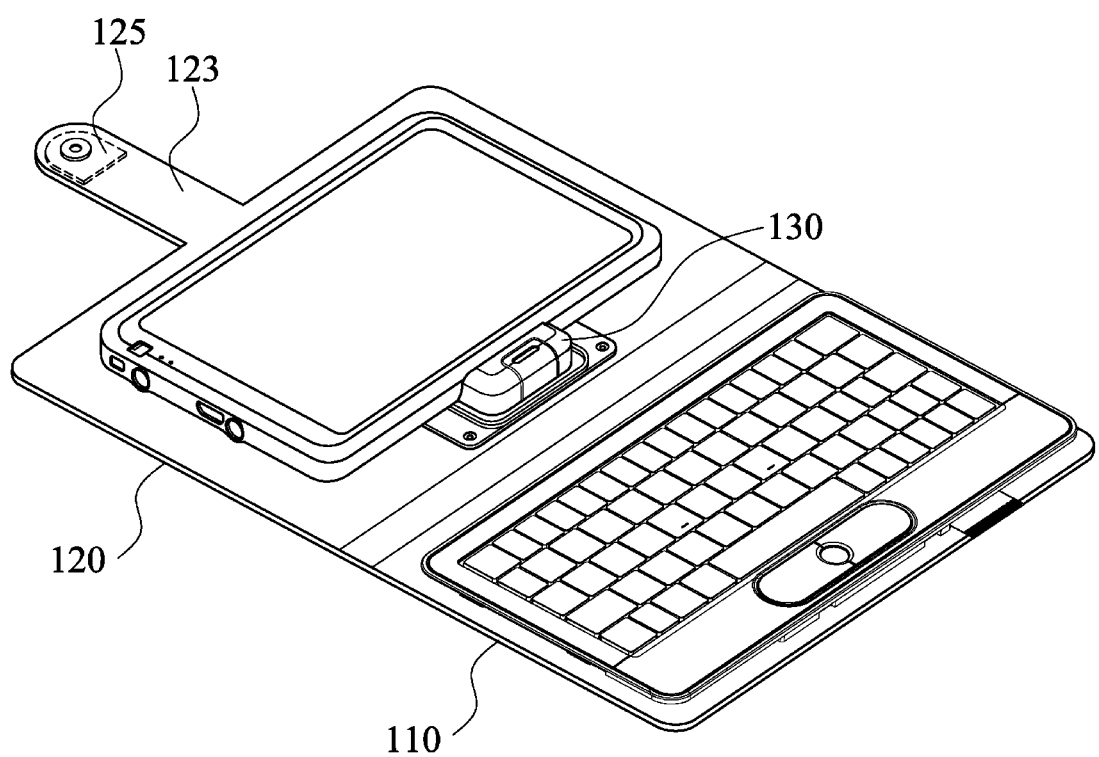
FIG. 3 shows a supporting portion of the embodiment of FIG. 1A extended to a flat form.

With reference to FIG. 3, the supporting portion 120 can be extended to a flat form. The extending section 123 is a belt, having a free end, and the second fixing element 125 is disposed on the free end.

The first fixing element 124 is connected to the second fixing element 125 by magnetic force. In a modified example, the first fixing element 124 can be disposed on a surface of the first supporting section 121, and connected to the second fixing element 125 by wedging or other means.

Figure 4A:
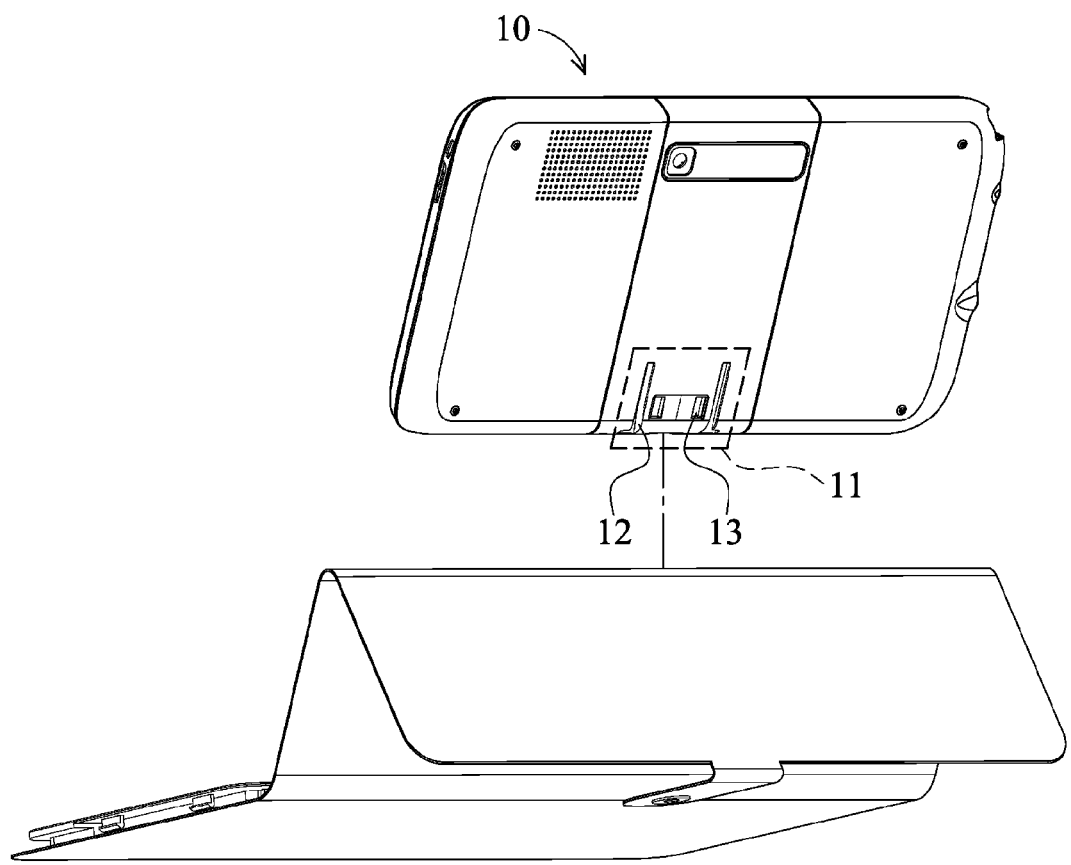
FIG. 4A shows a detailed structure of a connecting portion of the portable electronic device.
Figure 4B:
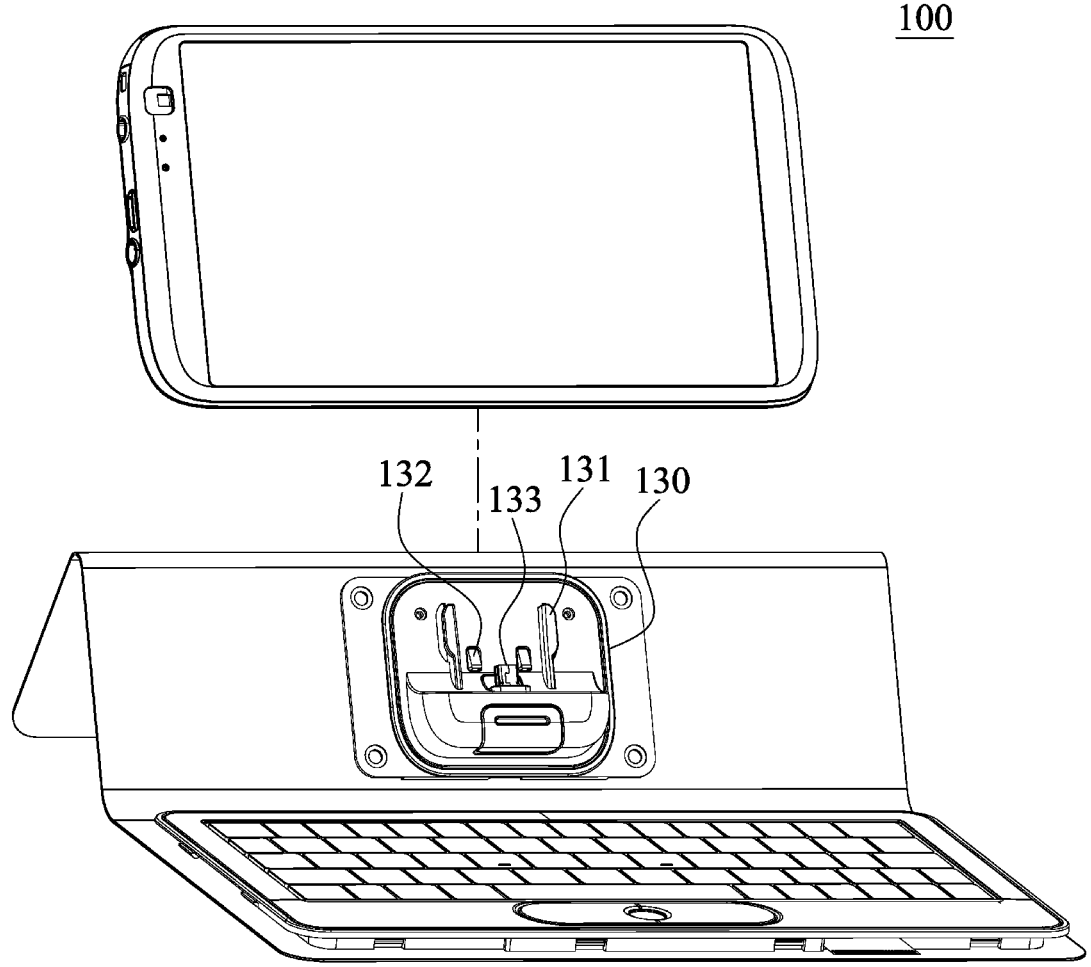
FIG. 4B shows a detailed structure of a connector of the package structure.

With reference to FIGS. 4A and 4B, the portable electronic device 10 comprises a connecting portion 11. The connecting portion 11 comprises sliding grooves 12 and wedging openings 13. The connector 130 comprises guiding ribs 131 and wedging protrusions 132. The guiding ribs 131 slide in the sliding grooves 12, and the wedging protrusions 132 wedge the wedging openings 13. In one embodiment, the connector 130 further comprises a joint 133 for electrically connected to the portable electronic device 10.

With reference to FIGS. 1A and 1B, the package structure 100 further comprises an input interface 150 disposed on the base portion 110, wherein the input interface 150 is electrically connected to the connector 130, and the connector 130 is electrically connected to the portable electronic device 10. Therefore, user can input data to the portable electronic device 10 via the input interface 150.

The input interface 150 can comprise keyboard, touch pad or other input means.

Figure 5:
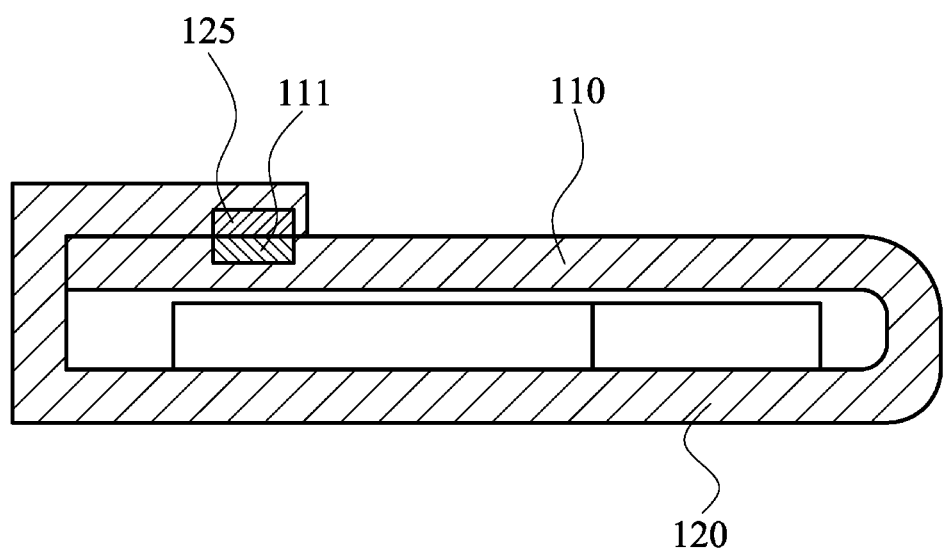
FIG. 5 shows the package structure in a packaging state.

With reference to FIG. 5, when the package structure 100 is in a packaging state, the base portion 110 and the supporting portion 120 cover the portable electronic device 10. The base portion 110 further comprises a third fixing element 111, and when the package structure 100 is in the packaging state, the second fixing element 125 is connected to the third fixing element 111.

The second fixing element 125 is connected to the third fixing element 111 by magnetic force. In a modified example, the second fixing element 125 can be connected to the third fixing element 111 by wedging or other means.

Figure 6:
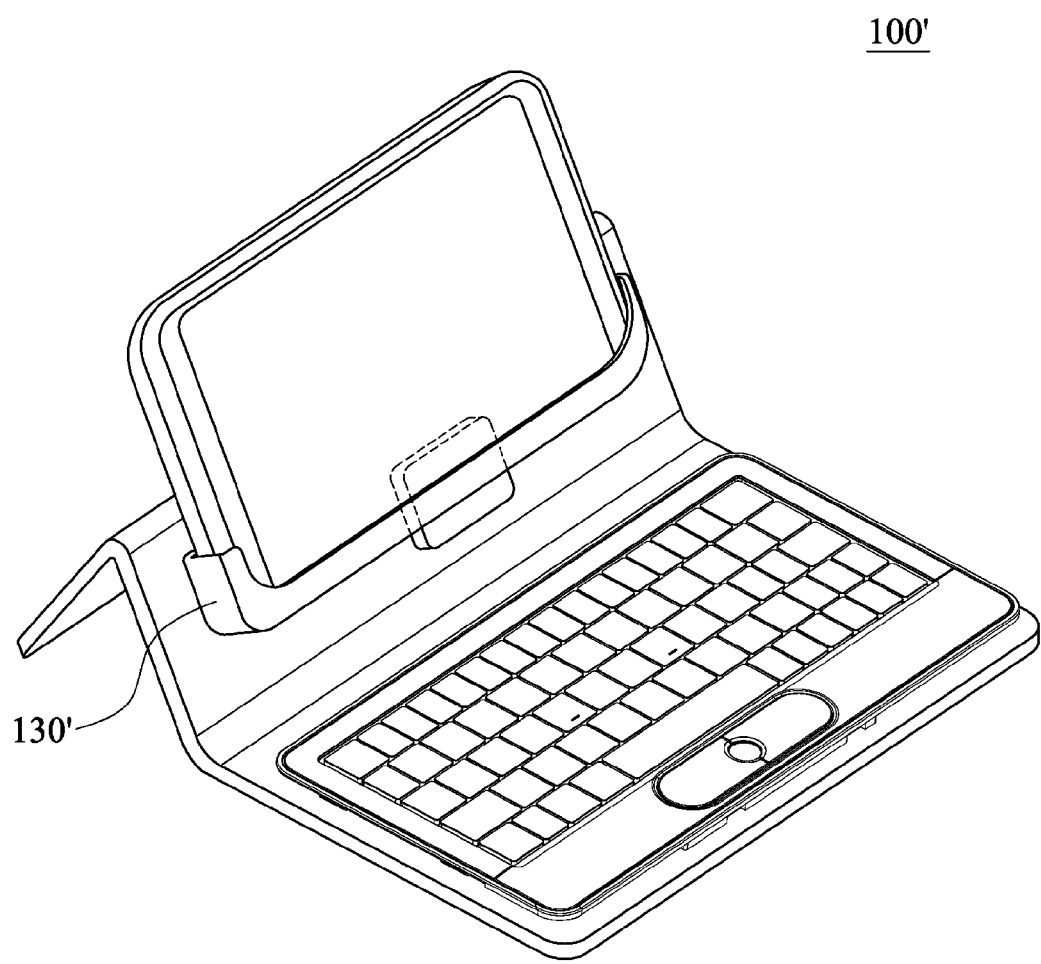
FIG. 6 shows a package structure 100' of a modified embodiment of the invention.

FIG. 6 shows a package structure 100' of a modified embodiment of the invention, wherein a connector 130' with a different design is utilized. The connector 130' is substantially U shaped with a groove for receiving the portable electronic device. The package structure 100' of the embodiment of FIG. 6 provides improved mechanical strength and supporting effect.

Utilizing the embodiments of the invention, the portable electronic device can stand upright by the package structure without additional supporting members. Additionally, the input interface is provided with a package structure allowing users to input data or instructions to the portable electronic device therethrough. Therefore, the embodiment allows users to use the portable electronic device in a convenient way.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A package structure for packaging a portable electronic device, comprising:
   a base portion;
   a supporting portion, connected to the base portion, comprises a first fixing element and a second fixing element, wherein when the package structure is in a supporting state, the supporting portion is folded and standing upright, the first fixing element is detachably connected to the second fixing element, and the portable electronic device is supported by the supporting portion; and
   a connector, disposed on a surface of the supporting portion, wherein the portable electronic device is connected to the connector,
   wherein the supporting portion is a planar structure, which comprises a first supporting section and a second supporting section, the first supporting section is connected to the base portion and the second supporting section, and the first supporting section and the second supporting section are planar, and
   wherein the supporting portion further comprises an extending section, and the extending section is connected to the second supporting section, the first fixing element is disposed at the first supporting section, and the second fixing element is disposed on the extending section.

2. The package structure as claimed in claim 1, wherein the extending section has a free end, and the second fixing element is disposed on the free end.

3. The package structure as claimed in claim 1, wherein the connector is disposed on the first supporting section.

4. The package structure as claimed in claim 1, wherein the connector is disposed on a surface of the first supporting section, and the first fixing element is embedded in the first supporting section.

5. The package structure as claimed in claim 1, wherein when the package structure is in the supporting state, a cross-section of the supporting portion is similar to an isosceles triangle, and a length of a cross-section of the first supporting section equals to a length of a cross-section of the second supporting section.

6. The package structure as claimed in claim 1, wherein the extending section is a belt.

7. The package structure as claimed in claim 1, wherein the first fixing element is connected to the second fixing element by magnetic force or wedging.

8. The package structure as claimed in claim 1, wherein the portable electronic device comprises a connecting portion, the connecting portion comprises at least one sliding groove, the connector comprises at least one guiding rib, and the guiding rib slides in the sliding groove.

9. The package structure as claimed in claim 1, wherein the portable electronic device comprises a connecting portion, the connecting portion comprises at least one wedging opening, the connector comprises at least one wedging protrusion, and the wedging protrusion wedges the wedging opening.

10. The package structure as claimed in claim 1, wherein when the package structure is in a packaging state, the base portion and the supporting portion cover the portable electronic device.

11. The package structure as claimed in claim 10, wherein the base portion comprises a third fixing element, and when the package structure is in the packaging state, the second fixing element is connected to the third fixing element.

12. The package structure as claimed in claim 11, wherein the second fixing element is connected to the third fixing element by magnetic force or wedging.

13. The package structure as claimed in claim 1, wherein the portable electronic device is electrically connected to the connector.

14. The package structure as claimed in claim 13, further comprising an input interface disposed on the base portion, wherein the input interface is electrically connected to the connector.

15. The package structure as claimed in claim 14, wherein the input interface comprises a keyboard and a touch pad, and data is input to the portable electronic device via the input interface.

16. The package structure as claimed in claim 15, wherein the package structure is a leather cover.

* * * * *